United States Patent
Ichimura

(10) Patent No.: US 7,842,366 B2
(45) Date of Patent: Nov. 30, 2010

(54) MULTI-LAYER OPTICAL INFORMATION RECORDING MEDIUM

(75) Inventor: Isao Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 757 days.

(21) Appl. No.: 11/196,934

(22) Filed: Aug. 4, 2005

(65) Prior Publication Data

US 2006/0038875 A1    Feb. 23, 2006

(30) Foreign Application Priority Data

Aug. 19, 2004    (JP) ............................ P2004-239339

(51) Int. Cl.
    *B32B 3/02* (2006.01)
(52) U.S. Cl. ................. 428/64.1; 428/64.4; 430/270.11
(58) Field of Classification Search ................ 428/64.1, 428/64.4, 64.5, 64.8; 430/270.11, 270.12, 430/270.14
    See application file for complete search history.

(56) References Cited

U.S. PATENT DOCUMENTS

| | | | | |
|---|---|---|---|---|
| 4,090,031 | A | * | 5/1978 | Russell ........................ 369/284 |
| 5,511,057 | A | * | 4/1996 | Holtslag et al. ................ 369/94 |
| 7,143,426 | B2 | * | 11/2006 | Mishima et al. ............. 720/718 |
| 7,345,973 | B2 | * | 3/2008 | Martens et al. .......... 369/47.53 |
| 2005/0219991 | A1 | * | 10/2005 | Van Den Oetelaar et al. ..... 369/275.1 |
| 2006/0028971 | A1 | * | 2/2006 | Mishima et al. .......... 369/275.1 |
| 2006/0203680 | A1 | * | 9/2006 | Hong et al. ................... 369/94 |

FOREIGN PATENT DOCUMENTS

| | | |
|---|---|---|
| JP | 03-157816 | 7/1991 |
| JP | 09-054957 | 2/1997 |
| JP | 2003-091834 | 3/2003 |
| JP | 2003-296969 | 10/2003 |
| JP | 2004-213720 | 7/2004 |

OTHER PUBLICATIONS

Shida et al., "The BD-Type Multi-layer 100 GB ROM Disk Using the Photopolymer Sheet," Technical Digest of International Symposium on Optical Memory, Nara, pp. 1-6, 2003.
Japanese Office Action issued on Jan. 27, 2009, for corresponding Japanese Patent Application JP 2004-239339.

* cited by examiner

*Primary Examiner*—Elizabeth Mulvaney
(74) *Attorney, Agent, or Firm*—K & L Gates LLP

(57) ABSTRACT

A multiple-layer optical information recording medium is provided. An information recording layer that is the farthest from the reading side is denoted by L0, L1, L2, . . . and L5 information recording layers are successively formed in the direction of the optical axis. Five spacers having thicknesses $t_0$ to $t_4$ are interposed between the information recording layers. The spacers satisfy the relationships $[\Delta t_m > A_{CCT} \times R_{m+1} \times R_{m+2} \times T_{m+1}^2 \times n\lambda/(2NA^2)]$ and $[\Delta t_{m-sum} > A_{CCT} \times R_{m+a} \times R_{m+b} \times T_{ab}^2 \times n\lambda/(2NA^2)]$. The thicknesses of the spacers of the six-layer disc satisfy the relationship $t_1 > t_3 > t_0 > t_2 > t_4$. In addition, the thicknesses of the spacers are properly designated so that the influence of multiple reflections is removed.

11 Claims, 11 Drawing Sheets

MULTI-LAYER OPTICAL INFORMATION RECORDING MEDIUM

CROSS REFERENCES TO RELATED APPLICATIONS

The present application claims priority to Japanese Patent Application No. 2004-239339 filed in the Japan Patent Office on Aug. 19, 2004, the entire contents of which being incorporated herein by reference.

BACKGROUND

The present invention relates to a multi-layer information recording medium that is typified by an optical disc and that has a plurality of information recording layers.

To increase the surface recording density (recording capacity per medium) of an optical disc, an optical disc apparatus Blu-ray Disc (trademark, hereinafter referred to as BD disc) that uses a blue-violet semiconductor laser (having a wavelength of approximately 405 nm) and a large numerical aperture objective lens has been proposed. In the BD, to decrease the diameter of a light beam spot, a light source having a wave length of 405 nm and an objective lens having a large numerical aperture (NA) of 0.85 are used.

It is assumed that the spot diameter is defined as $1.22 \times \lambda / NA$. Since a Compact Disc (CD) uses a light source having a wavelength of 780 nm and an objective lens having an NA of 0.45, the spot diameter of the CD is 2.11 µm. Since a Digital Versatile Disc (DVD) uses a light source having a wavelength of 650 nm and an objective lens having an NA of 0.6, the spot diameter of the DVD is 1.32 µm. In contrast, the spot diameter of the BD is as small as 0.58 µm whose spot area is around one fifth of that of the DVD. In addition, since the numerical aperture NA of the objective lens of the BD is increased, an angular error against 90 degrees formed between the disc surface and the optical axis of the laser light beam (this angular error is referred to as the tilt margin) becomes small, the thickness of a cover layer that coats information recording layers can be decreased to as thin as 0.1 mm.

In a one-sided, double-layer disc, an information recording layer formed at a depth of 100 µm from the incident surface of a laser light beam (in a BD-ROM disc, this layer represents a reflection layer, in a recordable BD disc, this layer represents both a reflection layer and a recording layer) is defined as the reference layer (referred to as the 0-th recording layer or the L0 layer) and a recording layer formed at a depth of 75 µm is defined as the first recording layer (or the L1 layer). Thus, to accomplish a larger recording capacity, it is thought that a multi-layer disc having a plurality of information recording layers is hopeful.

N. Shida, T. Higuchi, Y. Hosoda, H. Miyoshi, A. Nakano, and K. Tsuchiya, "The BD-Type Multi-layer 100 GB ROM Disk Using the Photopolymer Sheet," Technical Digest of International Symposium on Optical Memory, Nara, pp. 10 (2003) (hereinafter referred to as Shida et al.) proposes a multi-payer recording medium as the BD disc.

Shida et al. reports the feasibility of a four-layer BD disc. This document proposes that when materials of intermediate layers (spacers) that compose the four-layer BD disc have different thicknesses, the influence of multiple reflections that occur among the plurality of information recording layers be lightened. FIG. 1 shows the structure of the four-layer BD disc described in the non-patent document 1. The L0 layer is formed on a disc substrate 1 having a thickness of 1.1 mm. The L1, L2, and L3 layers are successively formed on the L0 layer. A light beam transmission layer (also referred to as the cover layer) is formed on the incident side of a laser light beam. The thickness of a spacer interposed between the L0 layer and the L1 layer is 15 µm. The thickness of a spacer interposed between the L1 layer and the L2 layer is 17 µm. The thickness of a spacer interposed between the L2 layer and the L3 layer is 13 µm. Thus, the spacers need to have thicknesses that differ by 2 µm or more.

The spacers of the multi-layer BD disc are often made of a film or a sheet material because a structure of intermediate layers having constant thicknesses can be easily accomplished than the spin coat method using ultraviolet setting resin material. Thus, with this method, a disc medium having six layers or eight or more layers can be accomplished.

However, with respect to a multi-layer medium having four or more information recording layers, in addition to multiple reflections that occur between adjacent spacers, multiple reflections that occur among a plurality of spacers that are not adjacent need to be considered.

SUMMARY

In view of the foregoing, it would be desirable to provide a multi-layer optical information recording medium that has a plurality of spacers of which the difference of thicknesses of two adjacent spacers is designated to a predetermined value or larger and of which the sum of the thicknesses of adjacent spacers has a predetermined relationship so as to effectively suppress multiple reflections that occur among the plurality of spacers that are not adjacent.

According to the present invention, there is provided in an embodiment a multi-layer optical information recording medium having four or more information recording layers on which signal information is recorded with information pits whose concave-convex surfaces or phases change or recording marks whose reflectances or phases change, wherein the information recording layers are denoted by the m-th information recording layer (where m is any integer that is 0 or larger), the information recording layer that is the farthest from an objective lens of a reproduction optical pickup being denoted by the 0th information recording layer, spacers being interposed between the information recording layers, the spacers being made of a transparent material and having nearly constant thicknesses, wherein when the thickness of the spacer interposed between the m-th information recording layer and the (m+1)th information recording layer is denoted by $t_m$, the thickness of the spacer interposed between the (m+1)-th information recording layer and the (m+2)-th information recording layer is denoted by $t_{m+1}$, the difference between the thicknesses $t_m$ and $t_{m+1}$ of the spacers is denoted by $\Delta t_m$, the sum of the thicknesses of the spacers interposed between the m-th information recording layer and the (m+a)-th (where a is any integer that is 2 or larger) information recording layer is denoted by $(t_m + t_{m+1} + \ldots + t_{m+a-1})$, the sum of the thicknesses of the spacers interposed between the (m+a)-th information recording layer and the (m+b)-th (where b is any integer that is 2 or larger) is denoted by $(t_{m+a} + t_{m+a+1} + \ldots + t_{m+b-1})$, and the difference between the sum $(t_m + t_{m+1} + \ldots + t_{m+a-1})$ and the sum $(t_{m+a} + t_{m+a+1} + \ldots + t_{m+b-1})$ is denoted by $\Delta t_{m-sum}$, then the thicknesses of the spacers are designated so that $\Delta t_m$ and $\Delta t_{m-sum}$ satisfy formulas (1) and (2):

$$\Delta t_m > A_{CCT} \times R_{m+1} \times R_{m+2} \times T_{m+1}^2 \times n\lambda/(2NA^2) \tag{1}$$

$$\Delta t_{m-sum} > A_{CCT} \times R_{m+a} \times R_{m+b} \times T_{ab}^2 \times n\lambda/(2NA^2) \tag{2}$$

where $A_{CCT}$ represents a crosstalk index, $R_{m+1}$, $R_{m+2}$, $R_{m+a}$, and $R_{m+b}$ represent the intensity reflectances of reflective films formed on the (m+1)-th layer, (m+2)-th layer, (m+a)-th layer, and (m+b)-th layer, respectively, $T_{m+1}$ represents the intensity transmissivity of the spacer $t_{m+1}$, $T_{ab}$ represents the intensity transmissivity from the (m+a)-th information recording layer to the (m+b)-th information recording layer, n represents the refractive index of the spacer material, and NA represents the numerical aperture of the objective lens.

According to the present invention in an embodiment, since a multi-layer disc has a structure of which the thicknesses of adjacent spacers satisfy a predetermined condition and the thicknesses of a plurality of spacers that are not adjacent satisfy a predetermined condition, signal deterioration due to multiple reflections can be minimized. In other words, inter-layer interference that occurs not only in adjacent spacers, but in a plurality of information recording layers that are not adjacent can be effectively suppressed. When the thickness of each spacer is designated according to inter-layer interference that depends on the reflectance thereof, the sum of the plurality of spacers can be necessarily minimized.

Additional features and advantages are described herein, and will be apparent from, the following Detailed Description and the figures.

DETAILED DESCRIPTION

The present invention relates to a multi-layer information recording medium that is typified by an optical disc and that has a plurality of information recording layers.

Next, with reference to the accompanying drawings, several embodiments of the present invention will described in detail. The present invention is not limited to the following embodiments. Instead, without departing from the spirit and scope of the present invention, any change of the embodiments may be made. In other words, the following embodiments are not limited to an optical disc medium. The embodiments may become effective for any recording systems that can accomplish multi-layer recording and multi-layer reproducing. First, as an embodiment of the present invention, a multi-layer BD disc will be described.

Figure 1:
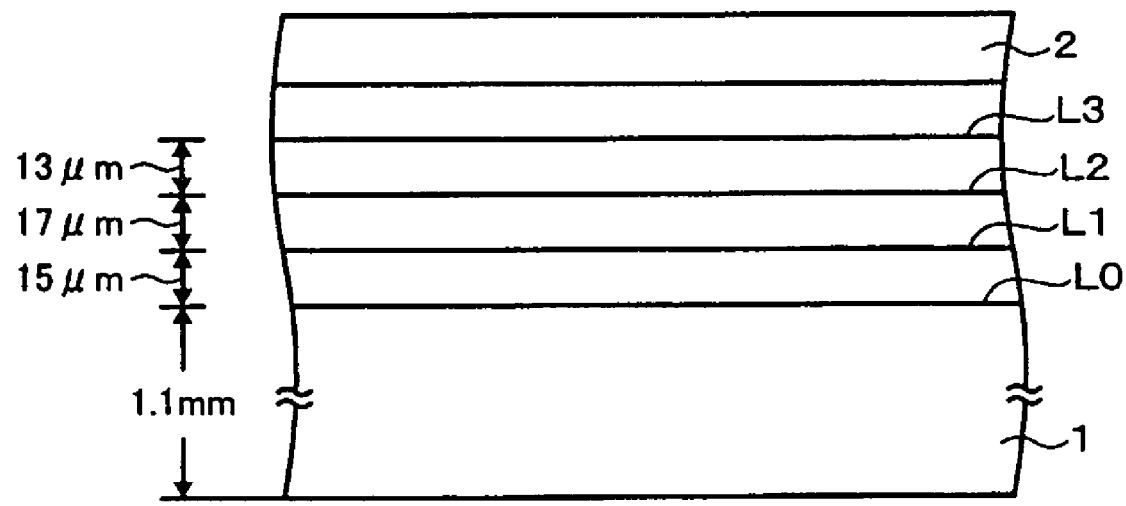
FIG. 1 is a schematic diagram showing the structure of layers of a four-layer optical disc according to related art.
Figure 2:
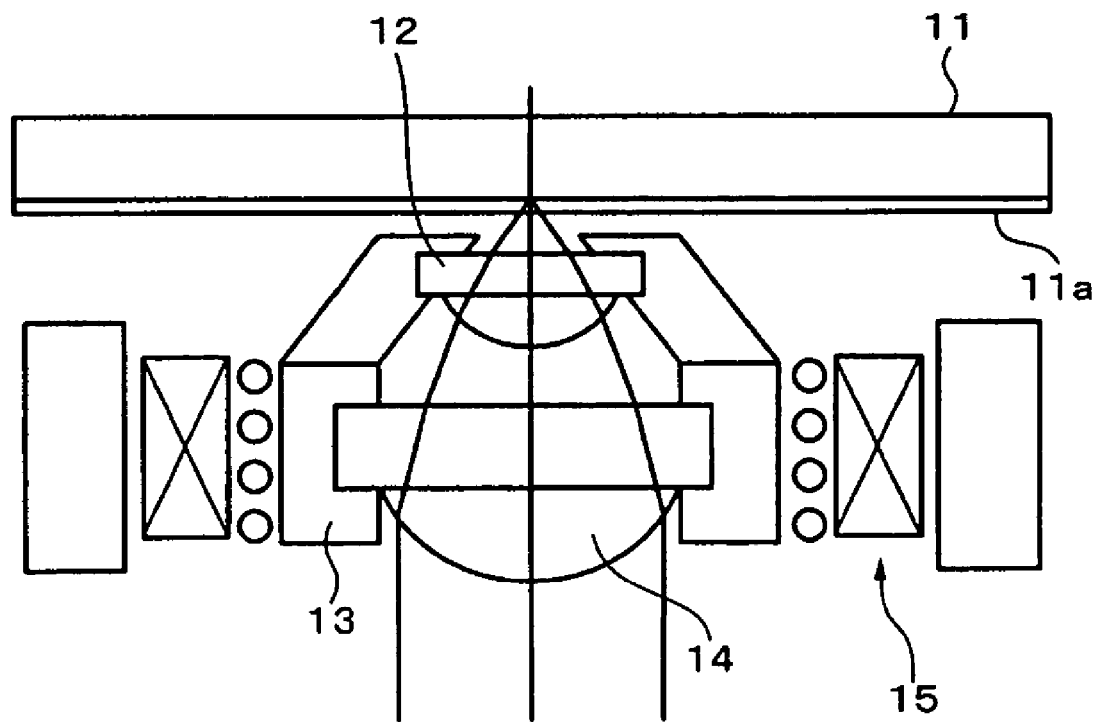
FIG. 2 is schematic diagram showing a high numerical aperture objective lens used to reproduce data from a BD disc according to an embodiment of the present invention.

FIG. 2 shows an example of the structure of an objective lens that is included in an optical pickup for the BD disc. The optical pickup is disposed so that it read a signal from an information recording layer on which the signal is recorded as an uneven pattern from the side of a cover layer 11a of a BD disc represented by reference numeral 11. The BD disc 11 has a structure of which an information recording layer and a thin type light beam transmission layer are formed on a polycarbonate substrate having a thickness of around 1.1 mm.

Reference numeral 12 represents a first objective lens. Reference numeral 14 represents a second objective lens. The first objective lens 12 and the second objective lens 14 are supported by a lens holder 13 so that they are positioned on the same optical axis. The two lens 12 and 14 function as a two-set objective lens having a numerical aperture of 0.85. The first objective lens 12 and the second objective lens 14 are mounted on a two-axis solenoid actuator 15 that moves in the direction of the optical axis and in a direction perpendicular to signal tracks. A light beam emitted from a semiconductor laser light source passes through the two lenses 12 and 14 and focus on the BD disc 11. Instead of the objective lenses 12 and 14, one high numerical aperture lens may be used.

Figure 3:
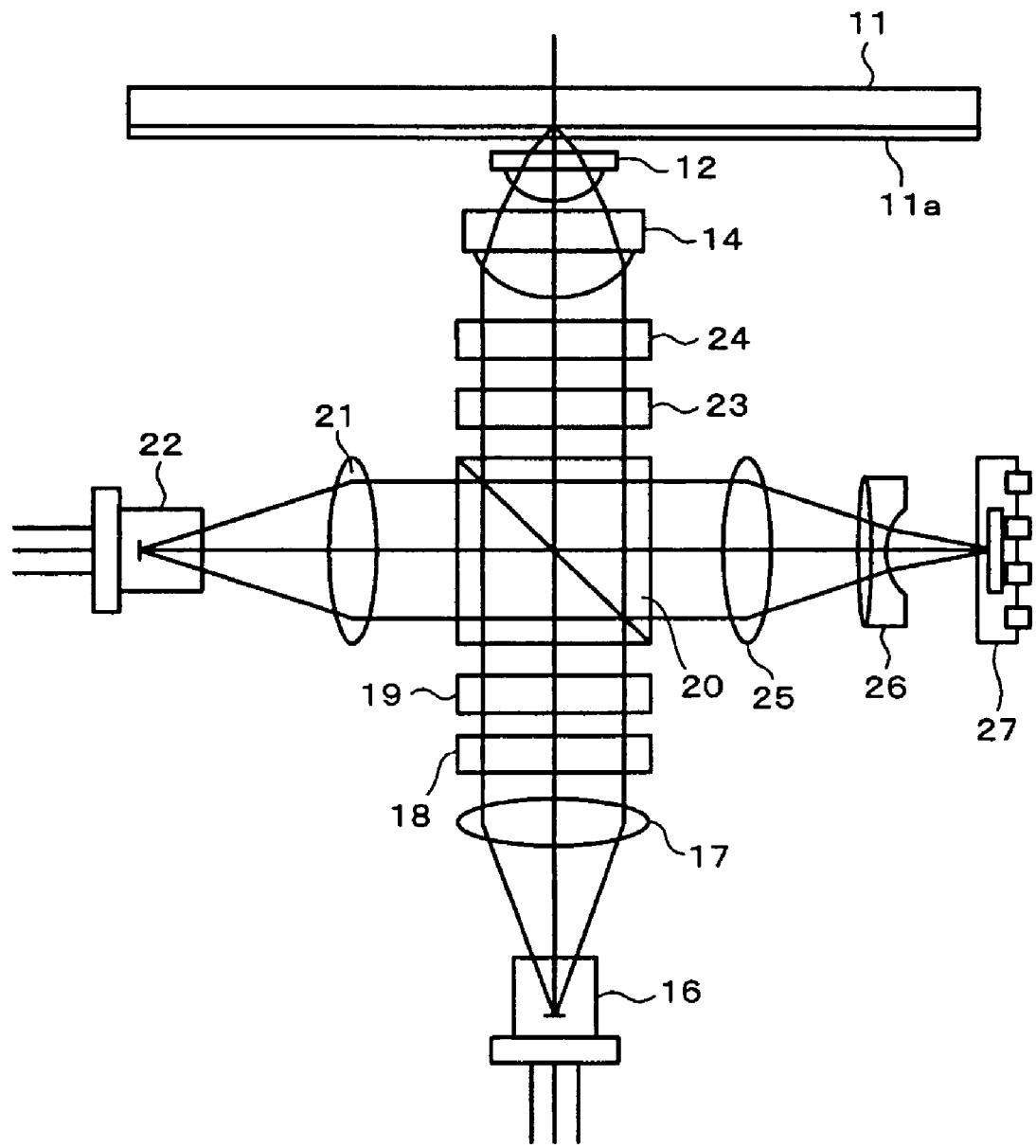
FIG. 3 is a schematic diagram showing an example of the structure of an optical system of an optical pickup used to reproduce data from the BD disc.

FIG. 3 shows an example of an optical pickup that reproduces data from the optical disc. A light beam emitted from a semiconductor laser 16 is collimated by a collimator lens 17. The collimated light beam passes through a diffraction grating 19, a polarized light beam splitter 20, a liquid crystal device 23, and a ¼ wavelength plate 24. The diffraction grating 19 generates a side spot used to calculate a track control error signal for a recordable medium and rewritable medium. Thereafter, the light beam enters the two-set objective lens (12, 14). The two-set objective lens (12, 14) focuses the light beam on the recording medium. When a linearly polarized light beam passes through the ¼ wavelength plate 24, a circularly polarized light beam occurs. When a circularly polarized light beam reflected by the disc passes through the ¼ wavelength plate 24, a linearly polarized light beam (a light beam of which the polarized plane is rotated by 90 degrees against the incident light beam) occurs.

Part of the emitted light of the semiconductor laser 16 is reflected by the polarized light beam splitter 20 and guided to a light receiving device 22 that detects the output of the emitted light beam by a condenser lens 21. The light receiving device 22 causes the intensity of the output of the laser to keep constant. The amount of the incident light beam to the light receiving device 22 can be adjusted by rotating the ½ wavelength plate 18. The intensity of the laser output is actually controlled by an automatic power control (APC) circuit (not shown) according to an output of the light receiving device 22.

Figure 4:
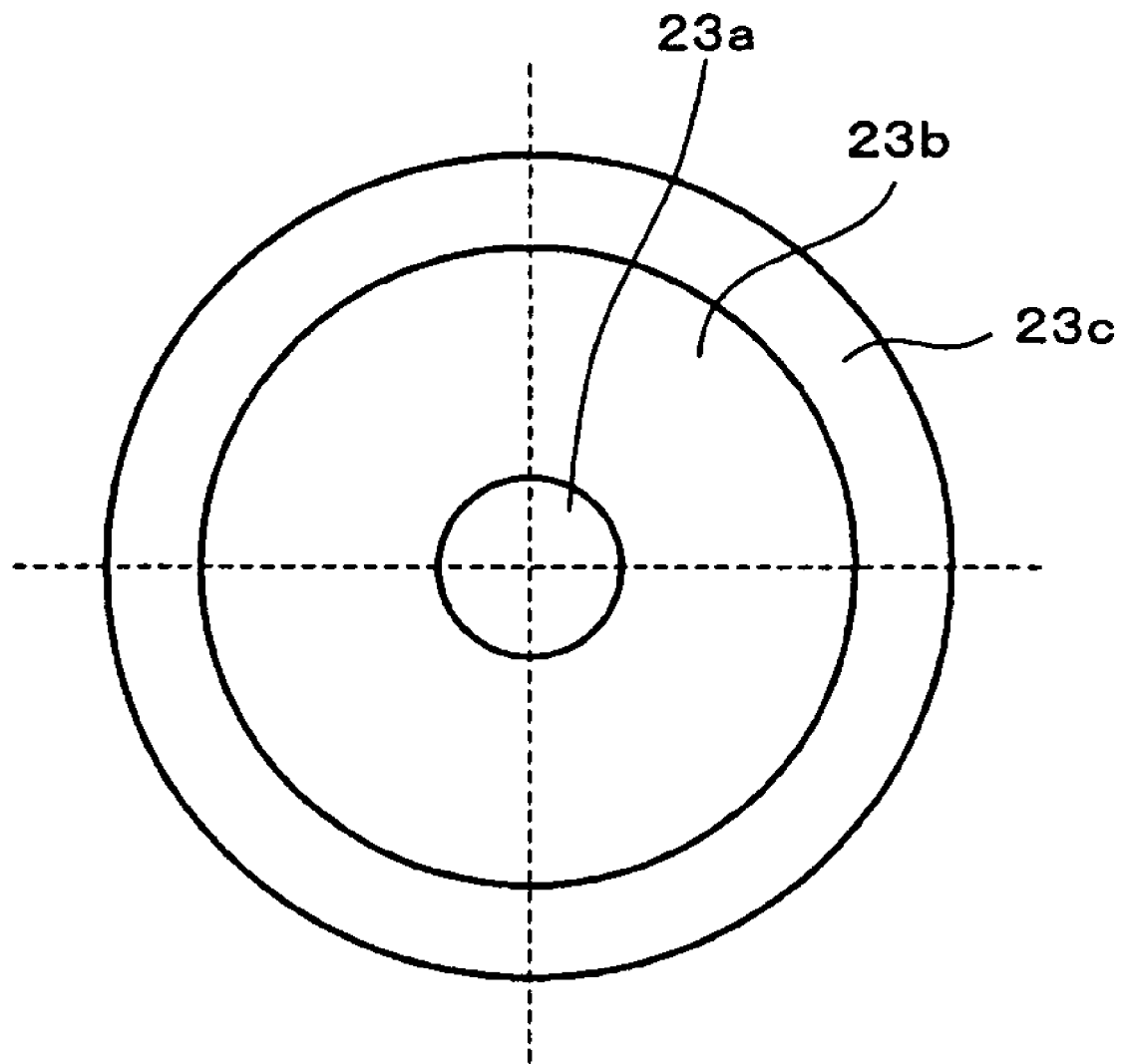
FIG. 4 is a schematic diagram showing the structure of polarization of electrodes of a liquid crystal device used for the optical pickup.

FIG. 4 shows a liquid crystal device 23 as an astigmatism compensation device. The liquid crystal device 23 has electrode patterns (23a, 23b, and 23c) that are formed in for example a concentric shape and generates a wave front almost equivalent to the amount of compensation of the astigmatism that occurs due to an error of the thickness of the cover layer corresponding to voltages applied to the electrodes.

Instead of the liquid crystal device 23, the astigmatism may be compensated by using an expander lens or by moving a collimator.

On the other hand, the light beam reflected from the BD disc 11 is reflected by the polarized light beam splitter 20 and then guided to a detection optical path. Thereafter, the light beam passes through a condenser lens 25 and a multi-lens 26 that converge the light beam. The converged light beam enters a light receiving device 27 that detects both a servo error signal and an RF signal. The light receiving device 27 converts the light beam into an electric signal.

Figure 5:
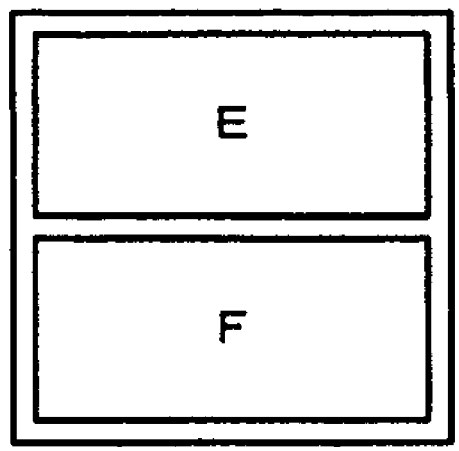
FIG. 5 is a schematic diagram showing the structure of a light receiving device used for the optical pickup.
Figure 5:
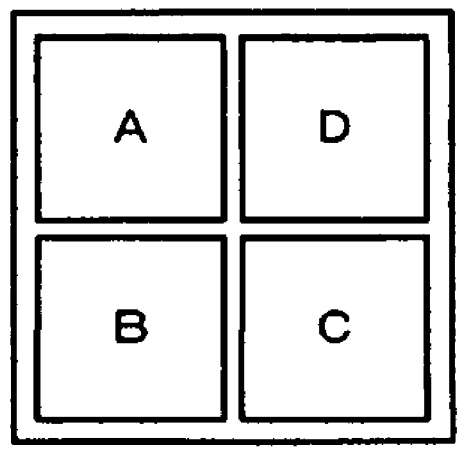
Figure 5:
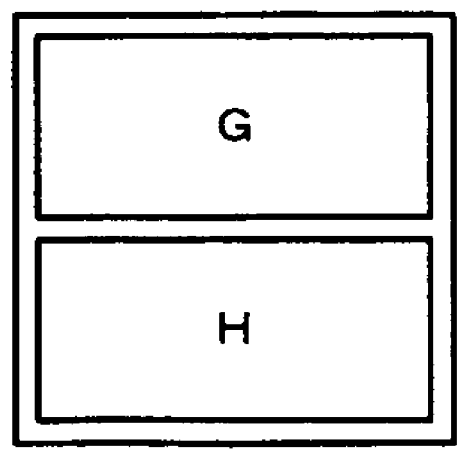

The light receiving device 27 is composed of for example an eight-division light beam detection device shown in FIG. 5. The light receiving device 27 calculates and obtains a focus error signal and a track error signal according to outputs of the individual elements A to H. The optical beam detection elements A to D compose a four-division light beam detector. A pair of light beam detection elements E and F and a pair of light beam detection elements G and H each compose a two-division light beam detector.

When there is no track error, the division position of the light beam detection elements E and F and the division position of the light beam detection elements G and H match the center of the beam spot. Depending on the amount of track error, the distribution of intensities of the beam pot deviates to one of the light beam detection elements against the division position.

Figure 6:
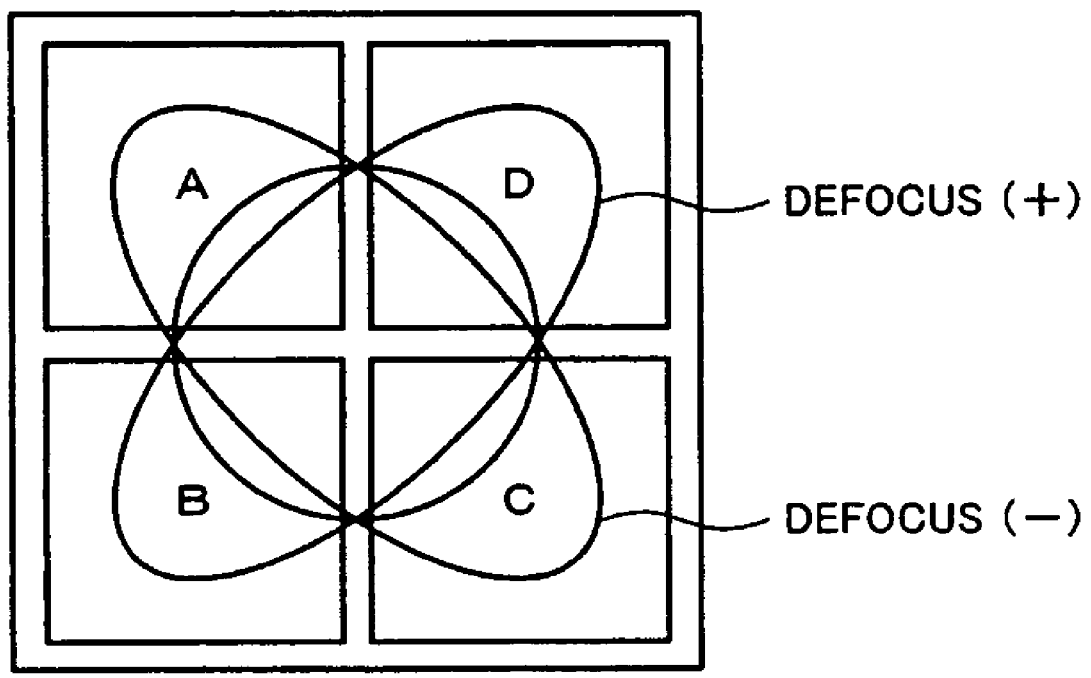
FIG. 6 is a schematic diagram describing the generation of an astigmatism focus error signal of a four-division light receiving device.

In this example, a focus error signal (FE) is used for the astigmatism focus error detection method. In this method, as shown in FIG. 6, when the light beam is focused by the multi-lens, the distribution of intensities of the light beam becomes circular on the light beam reception elements. When the light beam is defocused by the multi-lens, the distribution of intensities of light beam becomes ellipse on the light beam reception elements. Thus, when the light beam is focused by the multi-lens, the calculation result in formula (7) becomes zero level. When the light beam is defocused by the multi-lens, + or − FE signal (referred to the S letter error signal) occurs according to the distance.

$$FE=(A+C)-(B+D) \quad (7)$$

As a track error signal for a read-only ROM disc on which information pits have been formed, the differential phase detection (DPD) method is normally used. In this method, the phase difference between the sum signal of the light beam detection elements A and C and the sum signal of the light beam detection elements B and D is detected. A tracking error signal TEDPD represented by formula (8) is output. In the following calculation formulas, letters A to H represent not only the reference letters of the light reception elements, but values of output signals of the light detection elements.

$$TE_{DPD}=\phi(A+C)-\phi(B+D) \quad (8)$$

A track error signal for a recordable or rewritable optical disc having a convolutional groove structure is detected by the differential push-pull detection method. Specifically, a track error signal $TE_{DPP}$ is calculated by multiplying the sum of sub push-pull signals detected by two sub beams by a coefficient (k) and subtracting the result from a main push-pull signal detected by a main beam.

$$TE_{DPP}=(A+D)-(B+C)-k[(E-F)+(G-H)] \quad (9)$$

The RF signal and the SUM signal are expressed as the sum of the outputs of the elements A to D by the following formula (10). The full band components of the signal output are used as the RF signal. The low band components are used as the SUM signal.

$$RF=A+B+C+D \quad (10)$$

As the focus error signal, the spot size method or knife edge detection method may be used. As the track error signal, the single spot push-pull detection method may be used. According to an embodiment of the present invention, the servo error signal may be detected by another method.

When a signal is reproduced from the multi-layer optical disc with the optical pickup shown in FIG. 3, light beams are reflected from the multi-layer optical disc that has six information recording layers L0 to L5 made of for example a reflection film. Next, these reflected light beams will be described.

Figure 7:
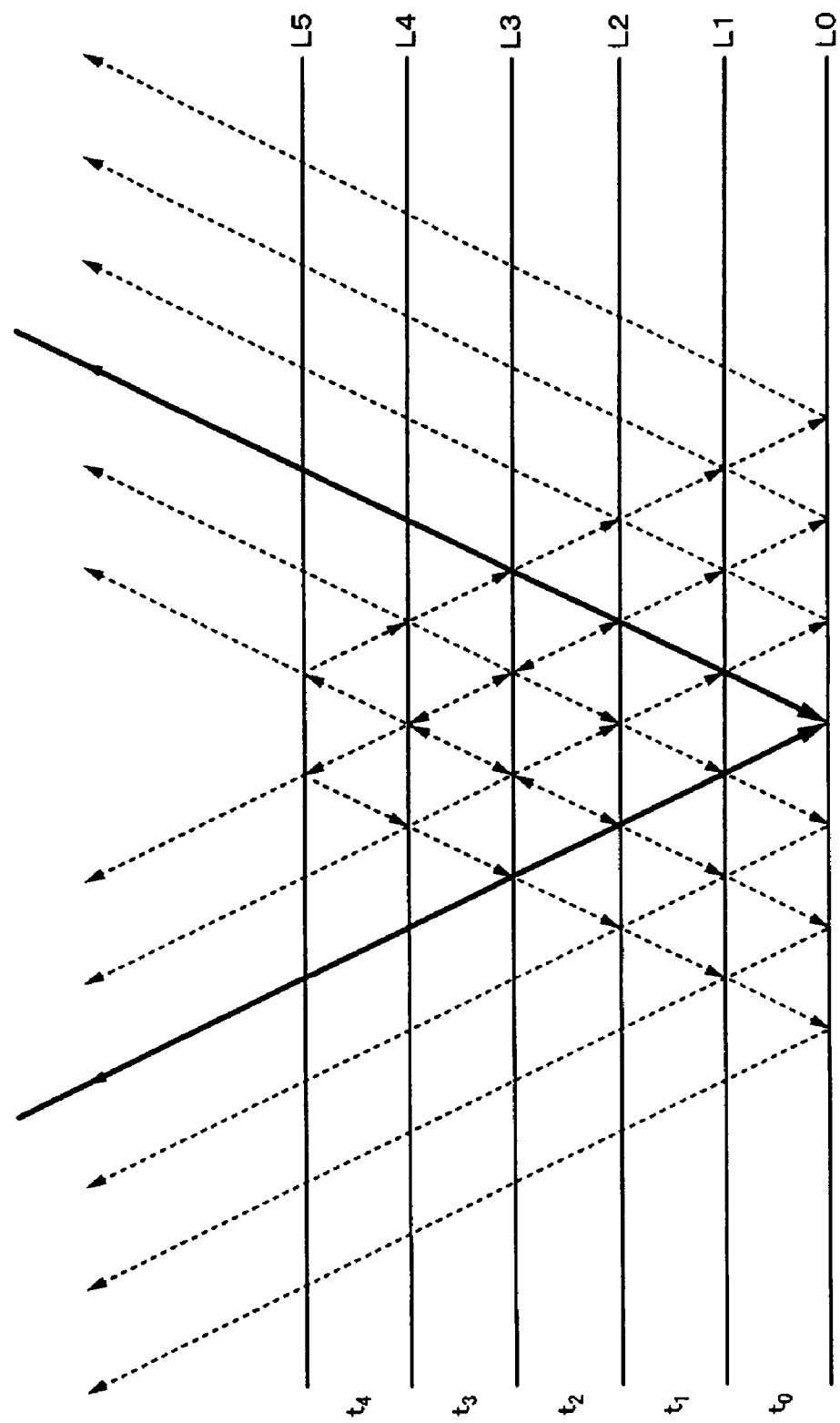
FIG. 7 is a schematic diagram showing an example of multiple reflections of a six-layer optical disc.

In FIG. 7, when a read light beam (denoted by a solid line) is emitted to the L0 layer, which is the farthest layer from the objective lens, the light beam is reflected on the L2 layer, which is the third farthest layer therefrom, and then multiply reflected on other layers as reflected light beams (denoted by dotted lines). Spacers are formed between adjacent information recording layers. The spacers are made of a transparent material and have nearly the same thicknesses.

In the example of the structure of the six-layer disc, since the thicknesses of the spacers are the same, the light beam reflected on the L2 layer is multiply reflected on other layers including the L3 and L4 layers and are overlapped with the light beam reflected on the L0 layer.

In addition, since light beams reflected on information recording layers other than the L2 layer are overlapped, the reproduction signal on the L0 layer is largely deteriorated by multiple reflections.

To solve this problem, it is effective to use spacers that have different thicknesses.

However, when the difference between the thickness ($t_m$) of the spacer interposed between the m-th information recording layer and the (m+1)-th information recording layer and the thickness ($t_{m+1}$) of the spacer interposed between the (m+1)-th information recording layer and the (m+2)-th information recording layer is $\Delta t_m$, it is necessary to consider inter-layer interference of the signal.

Thus, the influence of the inter-layer interference is formulated and $\Delta t_m$ is defined in consideration of both inter-layer interference due to light beams reflected on adjacent information recording layers and inter-layer interference due to light beams multiply reflected.

When the wavelength of the light source denoted by λ and the numerical aperture of the objective lens is denoted by NA, the diameter of a spot condensed on the m-th information recording layer by the objective lens is expressed by λ/NA. On the other hand, when the light beam passes through the (m+1)-th information recording layer and the refractive index of the material of the spacer is denoted by n, the diameter of the beam is approximately expressed by $2t_m \times NA/n$. Thus, the inter-layer interference defined as the ratio of the amplitudes of both the signals, namely coherent crosstalk CCT (m) can be expressed by the following formula.

$$CCT(m)=n\lambda/(2t_m NA^2) \quad (11)$$

As CCT (m) of the m-th information recording layer, considering the inter-layer interference of the adjacent information recording layer, formula (11) needs to satisfy a predetermined condition. Assuming that the allowable value of CCT (m) is −30 dB (namely, 0.0316), when CCT (m)=0.0316, n=1.55, λ=0.405 μm, and NA=0.85 are substituted into formula (11), $t_m$ becomes 13.7 μm. Although the allowable value of the crosstalk largely depends on the signal processing performance of the reproducing apparatus, the result obtained from formula (11) represents that the spacers used in the multi-layer BD disc need to have thicknesses of around 13 μm or more.

Figure 8:
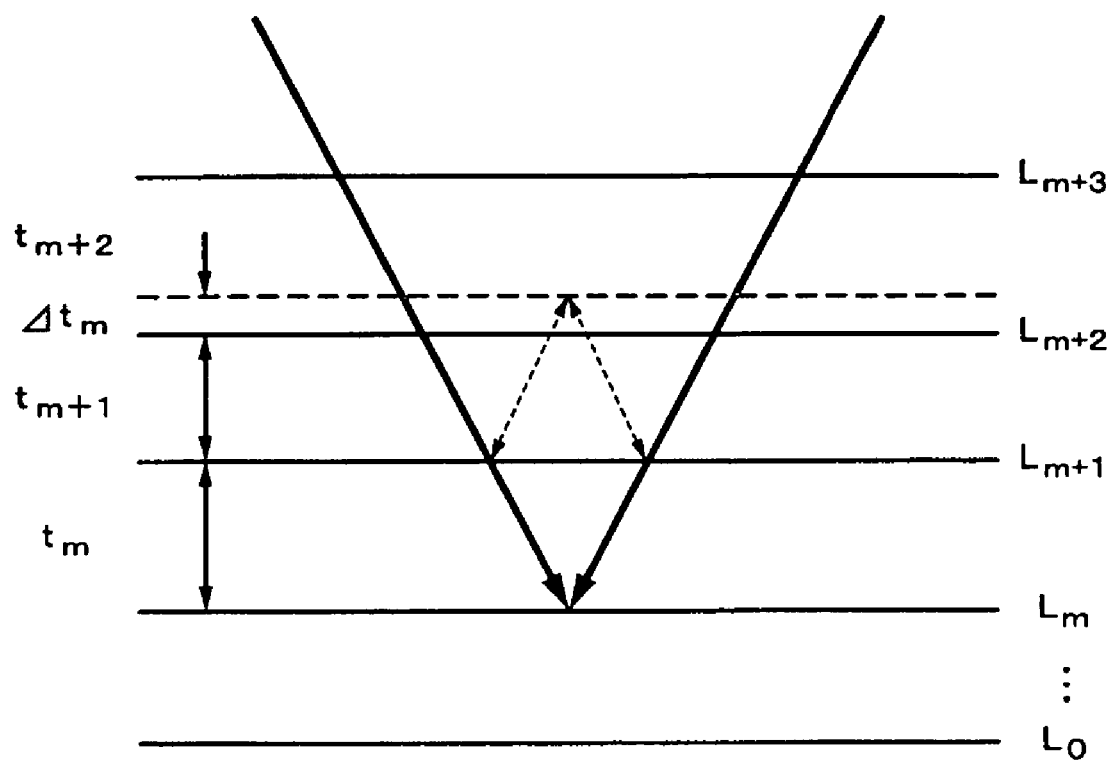
FIG. 8 is a schematic diagram showing multiple reflections in the case that the thicknesses of spacers differ by $\Delta t_m$.

Next, the multiple reflections that largely affect a reproduced signal of the multi-layer disc will be considered. Among these multiple reflections, light beams multiply reflected by adjacent information recording layers {(m+1)-th layer and (m+2)-th layer} shown in FIG. 8 most affect the reproduced signal. As shown in FIG. 8, light beams that are multiply reflected are apparently observed as a signal crosstalk at a position apart from the m-th information recording layer by $|t_m - t_{m+1}|$, namely $\Delta t_m$.

The inter-layer interference depends on the reflectance of each information recording layer that causes multiple reflections. Thus, when $\Delta t_m$ is substituted into tm of formula (11), the intensity reflectances of the (m+1)-th and (m+2)-th information recording layers that multiply reflect light beams are denoted by $R_{m+1}$ and $R_{m+2}$, respectively, the intensity transmissivity of the spacer $t_{m+1}$ is represented by $T_{m+1}$, and the allowable maximum value of CCT (m) is denoted by $CCT_{max}$, the following formula is obtained.

$$\Delta t_m > 1/CCT_{max} \times R_{m+1} \times R_{m+2} \times T_{m+1}^2 \times n\lambda/(2NA^2) \quad (12)$$

In addition, when $1/CCT_{max}$ of formula (12) is substituted with crosstalk index $A_{CCT}$, the following formula is obtained.

$$\Delta t_m > A_{CCT} \times R_{m+1} \times R_{m+2} \times T_{m+1}^2 \times n\lambda/(2NA^2) \quad (1)$$

Figure 9:
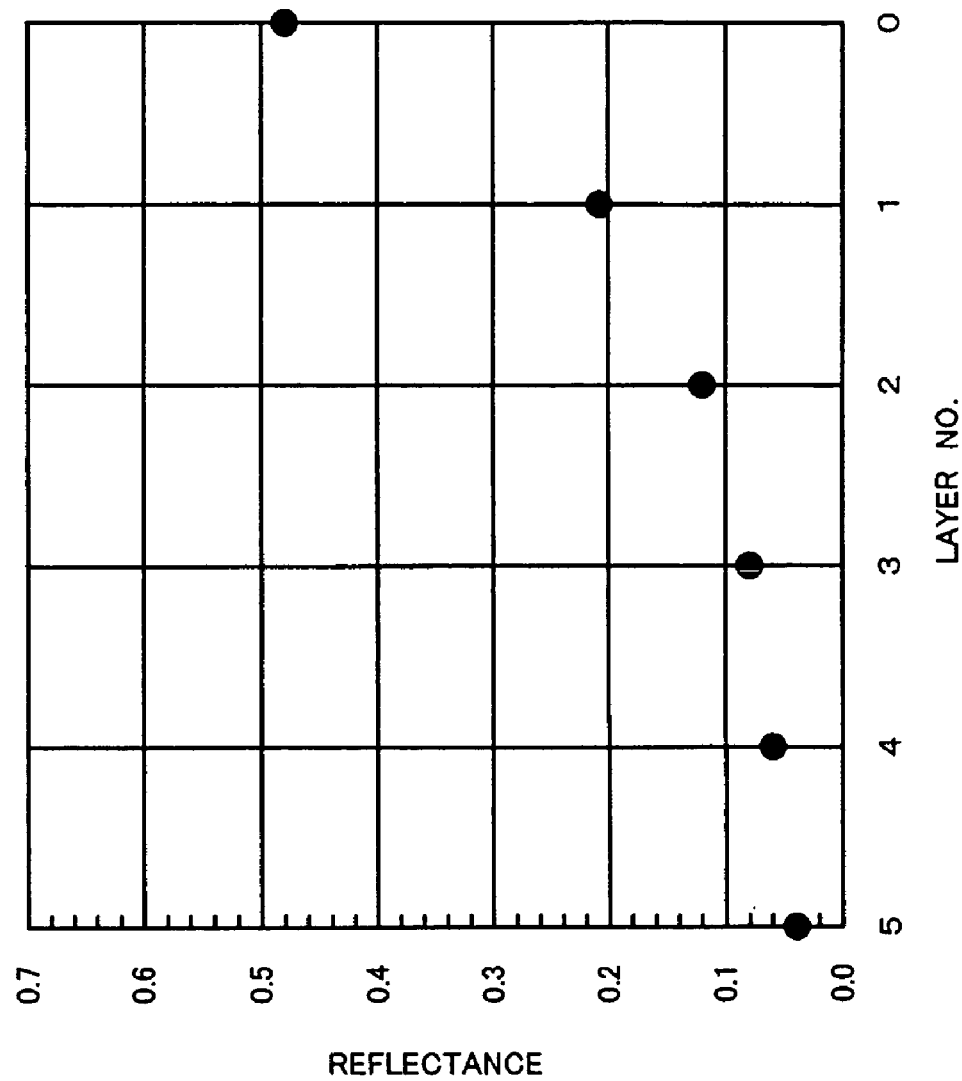
FIG. 9 is a graph showing an example of designed reflectance of the six-layer optical disc.

FIG. 9 shows a design example of reflectance of a six-layer disc. As shown in FIG. 8, inter-layer interference due to multiple reflection may contribute to a reflection in a small region of another information recording layer. Thus, the inter-layer interference due to multiple reflections may largely affect the reproduced signal in comparison with crosstalk of adjacent information recording layers that reflect light beams with an area larger than a predetermined area. Specifically, since a plurality of types of multiple reflections occur at the same time, it is necessary to decrease the influence of individual multiple reflections as low as possible.

For example, when the permissible value of $CCT_{max}$ is −40 dB (namely, 0.01), $A_{CCT}$ of formula (1) becomes 100, which is the reciprocal of 0.01. In this example, when the transmissivity of the spacers is 1 and the signal is reproduced from the L0 layer, the intensity reflectances of the L1 and L2 layers to be considered due to multiple reflections are around 0.21 and 0.12, respectively, from the graph shown in FIG. 9.

These values correspond to m=0 in formula (1). Thus, the necessary condition is $\Delta t_0 > 1.09$ µm. As described above, the spacers are made of a film or a sheet material and have nearly the same thicknesses. However, since the thicknesses of the spacers of the multi-layer disc vary by around ±1 µm, it is necessary to designate an allowance of 2 µm or more for the differences of the thicknesses of the spacers.

In addition, since the value of $\Delta t_m$ depends on reflectances ($R_{m+1}$, $R_{m+2}$), the differences of the thicknesses of the spacers of the information recording layers formed closer to the objective lens can be decreased because the designed reflectance thereof is small (see FIG. 9).

In addition, the influence of the inter-layer interference also depends on the signal processing performance of the reproducing apparatus. Thus, as CCT (m) due to multiple reflections, around −30 dB may be allowable. In this case, 31.6 may be substituted for $A_{CCT}$ in formula (1).

Figure 10:
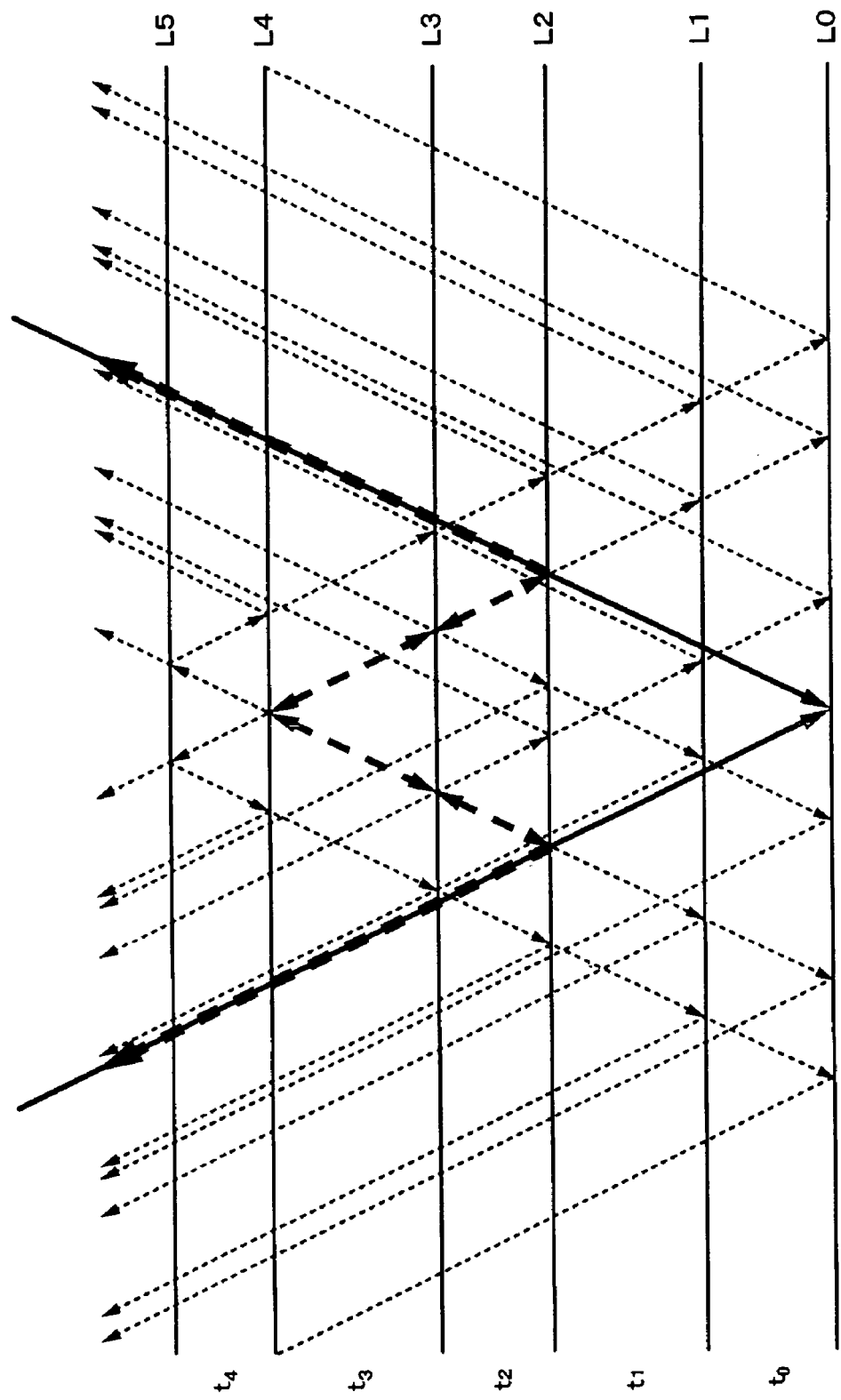
FIG. 10 is a schematic diagram showing an example of multiple reflections that occur among a plurality of spacers that are not adjacent.

Last, a method of decreasing inter-layer interference that occurs among a plurality of spacers that are not adjacent will be proposed. FIG. 10 shows that a light beam is condensed on the L0 layer, which is the farthest layer, and reflected on the L2 layer and multiply reflected on the other layers when all the spacers have different thicknesses.

In the example shown in FIG. 10, although the spacers have different thicknesses, the relationship of $t_0 + t_1 = t_2 + t_3$ is almost satisfied. In this case, part of incident light reflected on the layer L2 is reflected on the rear surface of the layer L4. Thereafter, the light beam is reflected on the layer L2 once again. Thus, this reflected light beam matches the light beam reflected on the layer L0 (read signal).

This means that it is not sufficient to consider multiple reflections between adjacent spacers. In other words, it is necessary to consider light beams multiply reflected among a plurality of spacers that are not adjacent. Thus, it is necessary to extend formula (1) for the sum of thicknesses of a plurality of spacers that are adjacent and satisfy the relationship expressed by formula (2).

$$\Delta t_{m-sum} > A_{CCT} \times R_{m+a} \times R_{m+b} \times T_{ab}^2 \times n\lambda/(2NA^2) \quad (2)$$

In the example shown in FIG. 10, interference of light beams multiply reflected on the layers L2 and L4 is considered against the light beam (read signal) reflected on the layer L0. Thus, in this case, m=0, a=2, and b=4 are substituted in formula (2). $\Delta t_{m-sum}$ represents the difference of thicknesses corresponding to $|t_0 + t_1 - (t_2 + t_3)|$. Thus, the thicknesses of spacers are designated with m, a, and b (where b>a) substituted into formula (2).

Figure 11:
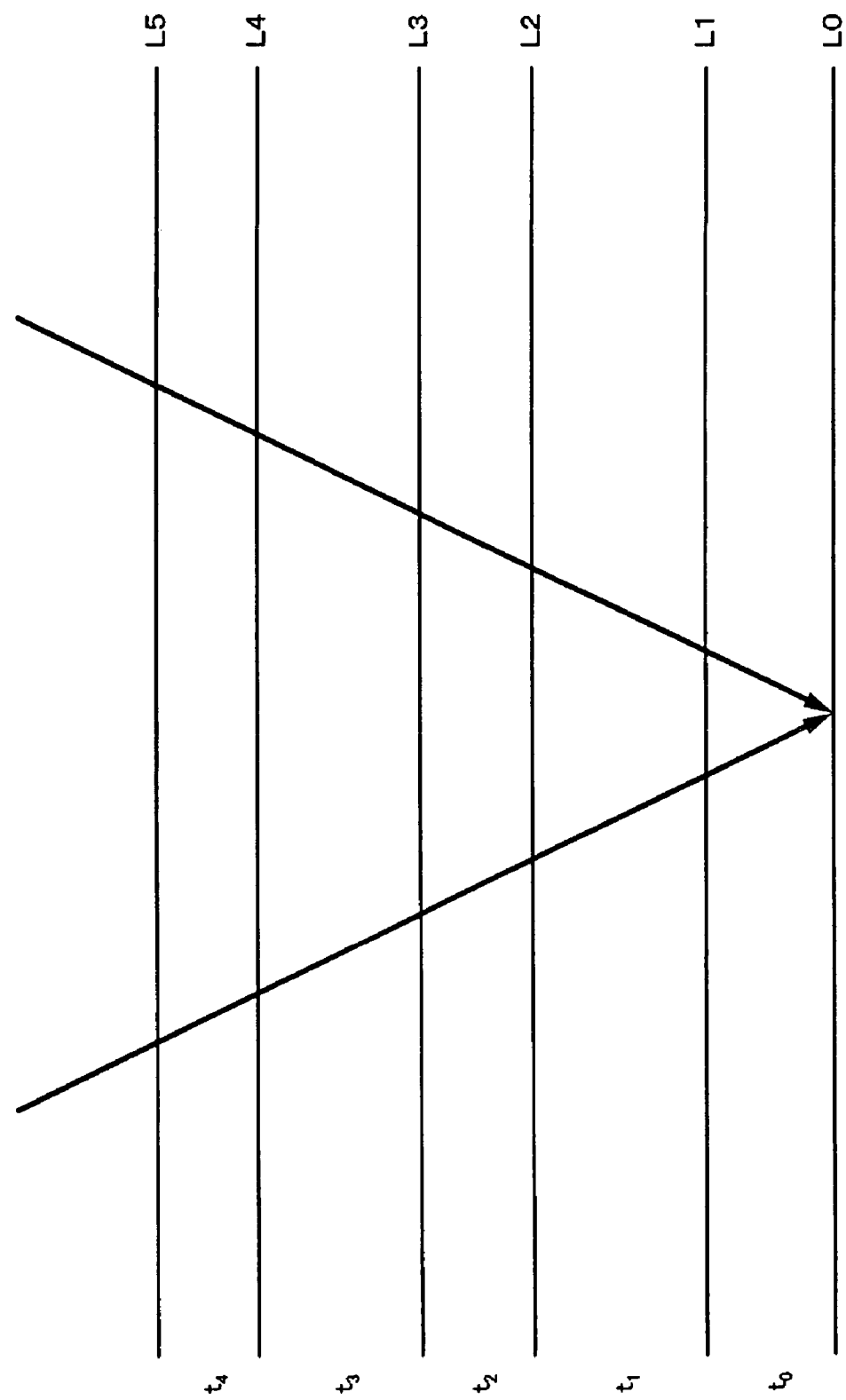
FIG. 11 is a schematic diagram showing an example of the structure of the six-layer optical disc according to an embodiment of the present invention.

FIG. 11 shows a six-layer disc that satisfies formulas (1) and (2) for all spacers according to an embodiment of the present invention. In the six-layer disc, with the thicknesses of the spacers having the relationship of $t_1 > t_3 > t_0 > t_2 > t_4$, the influence of multiple reflections can be removed. As an example, the thickness of the spacers can be designated as $t_0 = 14$ µm, $t_1 = 17$ µm, $t_2 = 12$ µm, $t_3 = 15$ µm, and $t_4 = 10$ µm.

In addition, according to an embodiment of the present invention, when a multi-layer optical information recording medium has a structure that satisfies both formulas (3) and (4) or both formulas (5) and (6) for the thickness $t_{2k}$ of the 2k-th spacer (where k is an integer larger than 0) and thicknesses $t_{k+1}$, $t_{2k+1}$, and $t_{2(k+1)}$ that are adjacent to the 2k-th spacer, the influence of the inter-layer interference can be equalized.

$$t_{2k+1} > t_{2k} \quad (3)$$

$$t_{2k+1} > t_{2(k+1)} \quad (4)$$

or $$t_{2k} > t_{2k+1} \quad (5)$$

$$t_{2(k+1)} > t_{2k+1} \quad (6)$$

In the foregoing embodiment, for example, a six-layer disc was described. However, the present invention is not limited to this embodiment. Without departing from the spirit and scope of the present invention, various modifications and ramifications of the embodiment may be made.

For example, an embodiment of the present invention may be applied to a multi-layer disc medium having more than six layers. Likewise, an embodiment of the present invention may be applied to a read-only disc, a recordable disc, and a rewritable disc. In addition, an embodiment of the present invention may be applied to not only an optical disc medium, but other multi-layer mediums and volume type recording mediums that three-dimensionally record signal information.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A multi-layer optical information recording medium comprising four or more information recording layers on which signal information is recorded with any one of information pits whose concave-convex surfaces or phases change and recording marks whose reflectances or phases change, wherein the information recording layers are denoted by the m-th information recording layers, where m is any integer that is 0 or larger, an information recording layer that is farthest from an objective lens of a reproduction optical pickup being denoted by a 0th information recording layer, spacers being interposed between the information recording layers, the spacers being made of a transparent material and having nearly constant thicknesses, wherein when the thickness of the spacer interposed between the m-th information recording layer and an (m+1)th information recording layer is denoted by $t_m$, the thickness of the spacer interposed between the (m+1)-th information recording layer and a (m+2)-th information recording layer is denoted by $t_{m+1}$, the difference between the thicknesses $t_m$ and $t_{m+1}$ of the spacers is denoted by $\Delta t_m$, the sum of the thicknesses of the spacers interposed between the m-th information recording layer and a (m+a)-th, where a is any integer that is 2 or larger, information recording layer is denoted by $(t_m+t_{m+1}+\ldots+t_{m+a-1})$, the sum of the thicknesses of the spacers interposed between the (m+a)-th information recording layer and a (m+b)-th, where b is any integer that is 2 or larger, is denoted by $(t_{m+a}+t_{m+a+1}+\ldots+t_{m+b-1})$, and the difference between the sum $(t_m+t_{m+1}+\ldots+t_{m+a-1})$ and the sum $(t_{m+a}+t_{m+a+1}+\ldots+t_{m+b-1})$ is denoted by $\Delta t_{m-sum}$, then the thicknesses of the spacers are designated so that $\Delta t_m$ and $\Delta t_{m-sum}$ satisfy formulas (1) and (2):

$$\Delta t_m > A_{CCT} \times R_{m+1} \times R_{m+2} \times T_{m+1}^2 \times n\lambda/(2NA^2) \quad (1)$$

$$\Delta t_{m-sum} > A_{CCT} \times R_{m+a} \times R_{m+b} \times T_{ab}^2 \times n\lambda/(2NA^2) \quad (2)$$

where $A_{CCT}$ represents a crosstalk index, $R_{m+1}$, $R_{m+2}$, $R_{m+a}$, and $R_{m+b}$ represent an intensity reflectances associated with reflective films formed on the (m+1)-th layer, (m+2)-th layer, (m+a)-th layer, and (m+b)-th layer, respectively, $T_{m+1}$ represents an intensity transmissivity of the spacer $t_{m+1}$, $T_{ab}$ represents an intensity transmissivity from the (m+a)-th information recording layer to the (m+b)-th information recording layer, n represents a refractive index of the spacer material, and NA represents a numerical aperture of the objective lens, wherein the crosstalk index ($A_{CCT}$) ranges from 31.6 to 100, and wherein the intensity reflectances associated with reflective films are due to multiple reflections and decrease in a direction closer to an objective lens, and the differences in thicknesses between the spacers can be decreased in the direction closer to the objective lens based on the decreasing intensity reflectances associated with the reflective films.

2. The multi-layer optical information recording medium as set forth in claim 1, wherein the thickness of a 2k-th, where k is any integer that is 0 or larger spacer and the thicknesses $t_{2k+1}$ and $t_{2(k+1)}$ of the adjacent spacers of the 2k-th spacer satisfy any one of both formulas (3) and (4) and both formulas (5) and (6):

$$t_{2k+1} > t_{2k} \quad (3)$$

$$t_{2k+1} > t_{2(k+1)} \quad (4)$$

or $$t_{2k} > t_{2k+1} \quad (5)$$

$$t_{2(k+1)} > t_{2k+1} \quad (6).$$

3. The multi-layer optical information recording medium as set forth in claim 1, wherein the spacers that have the nearly constant thicknesses are made of a transparent sheet or a film material.

4. The multi-layer optical information recording medium as set forth in claim 1, wherein the multi-layer information recording medium is an optical disc medium.

5. The multi-layer optical information recording medium as set forth in claim 1, wherein the 0th information recording layer is formed on a transparent substrate.

6. The multi-layer optical information recording medium as set forth in claim 1, wherein a light beam transmission layer is formed on the information recording layer that is in closest proximity to the objective lens of the reproduction optical pickup.

7. A method of manufacturing a multi-layer optical information recording medium comprising four or more information recording layers, the method comprising:

forming four or more information recording layers successively in a direction of an optical axis on which signal information is recorded with any one of information pits whose concave-convex surfaces or phases change and recording marks whose reflectances or phases change the information recording layers are denoted by the m-th information recording layers, where m is any integer that is 0 or larger, an information recording layer that is farthest from an objective lens of a reproduction optical pickup being denoted by a 0th information recording layer; and forming a plurality of spacers each interposed between successive information recording layers, the spacers being made of a transparent material and having nearly constant thicknesses; and determining the thicknesses of the spacers so that $\Delta t_m$ and $\Delta t_{m-sum}$ satisfy formulas (1) and (2):

$$\Delta t_m > A_{CCT} \times R_{m+1} \times R_{m+2} \times T_{m+1}^2 \times n\lambda/(2NA^2) \quad (1)$$

$$\Delta t_{m-sum} > A_{CCT} \times R_{m+a} \times R_{m+b} \times T_{ab}^2 \times n\lambda/(2NA^2) \quad (2)$$

wherein when the thickness of the spacer interposed between the m-th information recording layer and an (m+1)th information recording layer is denoted by $t_m$, the thickness of the spacer interposed between the (m+1)-th information recording layer and a (m+2)-th information recording layer is denoted by $t_{m+1}$, the difference between the thicknesses $t_m$ and $t_{m+1}$ of the spacers is denoted by $\Delta t_m$, the sum of the thicknesses of the spacers interposed between the m-th information recording layer and a (m+a)-th, where a is any integer that is 2 or larger, information recording layer is denoted by $(t_m+t_{m+1}+\ldots+t_{m+a-1})$, the sum of the thicknesses of the spacers interposed between the (m+a)-th information recording layer and a (m+b)-th, where b is any integer that is 2 or larger, is denoted by $(t_{m+a}+t_{m+a+1}+\ldots+t_{m+b-1})$, and the difference between the sum $(t_m+t_{m+1}+\ldots+t_{m+a-1})$ and the sum $(t_{m+a}+t_{m+a+1}+\ldots+t_{m+b-1})$ is denoted by $\Delta t_{m-sum}$, where $A_{CCT}$ represents a crosstalk index, $R_{m+1}$, $R_{m+2}$, $R_{m+a}$, and $R_{m+b}$ represent an intensity reflectances associated with reflective films formed on the (m+1)-th layer, (m+2)-th layer, (m+a)-th layer, and (m+b)-th layer, respectively, $T_{m+1}$ represents an intensity transmissivity of the spacer $t_{m+1}$, $T_{ab}$ represents an intensity transmissivity from the (m+a)-th information recording layer to the (m+b)-th information recording layer, n represents a refractive index of the spacer material, and NA represents a numerical aperture of the objective lens, and wherein the intensity reflectances associated with reflective films are due to multiple reflections and decrease in a direction closer to an objective lens, and the differences in thicknesses between the spacers can be decreased in the direction closer to the objective lens based on the decreasing intensity reflectances associated with the reflective films.

8. A method of manufacturing a multi-layer optical information recording medium as set forth in claim 7, wherein the thickness of a 2k-th, where k is any integer that is 0 or larger spacer and the thicknesses $t_{2k+1}$ and $t_{2(k+1)}$ of the adjacent spacers of the 2k-th spacer satisfy any one of both formulas (3) and (4) and both formulas (5) and (6):

$$t_{2k+1} > t_{2k} \tag{3}$$

$$t_{2k+1} > t_{2(k+1)} \tag{4}$$

or $$t_{2k} > t_{2k+1} \tag{5}$$

$$t_{2(k+1)} > t_{2k+1} \tag{6).}$$

9. A method of manufacturing a multi-layer optical information recording medium as set forth in claim 7, wherein the spacers that have the nearly constant thicknesses are made of a transparent sheet or a film material.

10. A method of manufacturing a multi-layer optical information recording medium as set forth in claim 7, further comprising forming the 0th information recording layer on a transparent substrate.

11. A method of manufacturing a multi-layer optical information recording medium as set forth in claim 7, comprising forming a light beam transmission layer on the information recording layer that is in closest proximity to the objective lens of the reproduction optical pickup.

\* \* \* \* \*